No. 889,315. PATENTED JUNE 2, 1908.
D. M. KENYON.
APPARATUS FOR COUPLING PIPES.
APPLICATION FILED MAY 31, 1907.
3 SHEETS—SHEET 3.
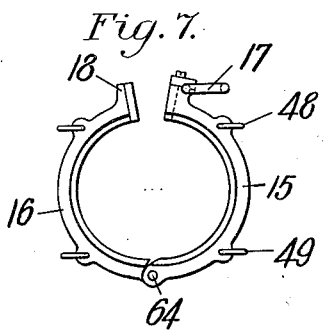
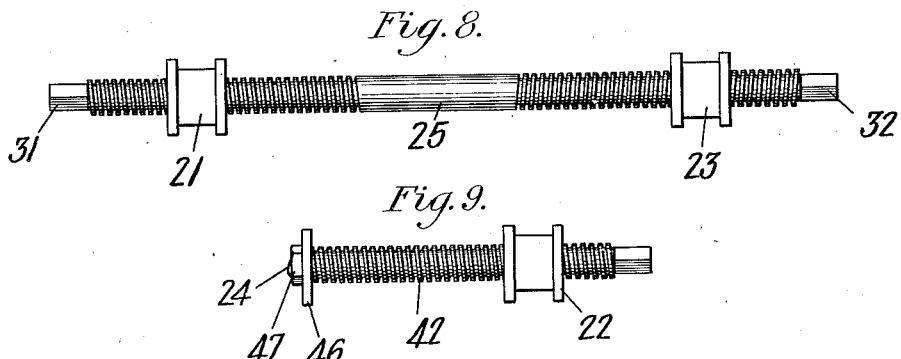
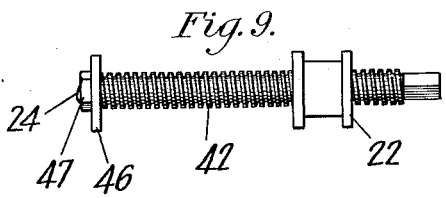
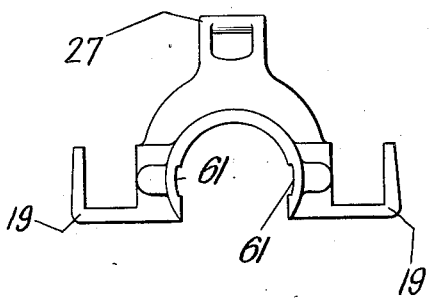
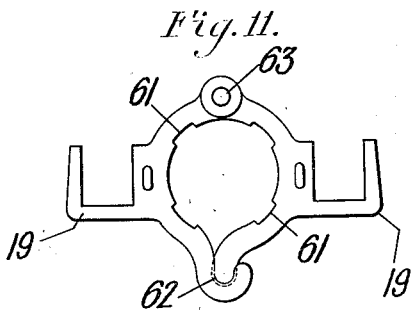
Witnesses.
A. G. Sullivan
Everett W. Curtis
Inventor:
Daniel M. Kenyon
by Chas. F. Perrins
his Attorney

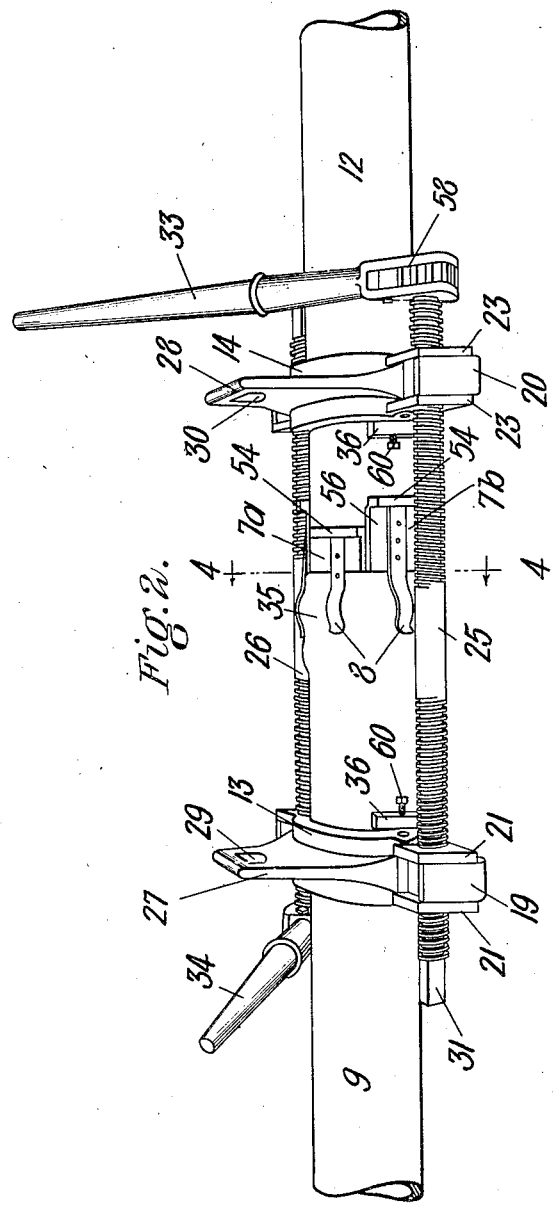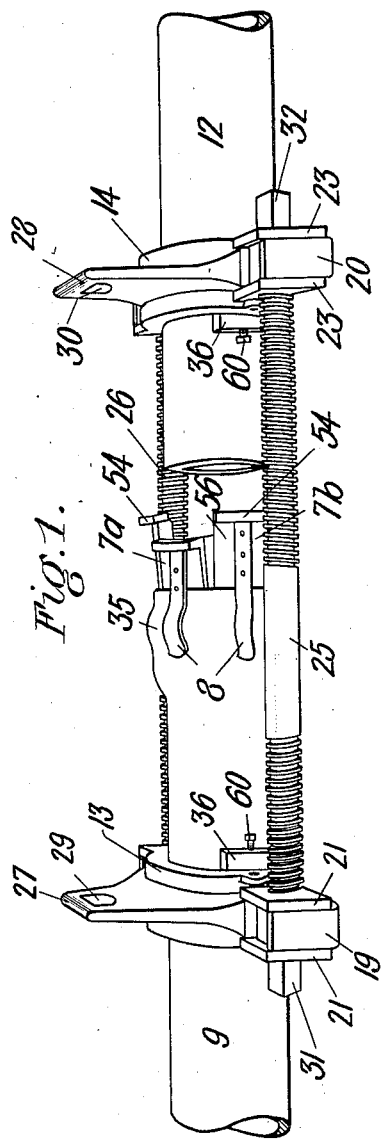

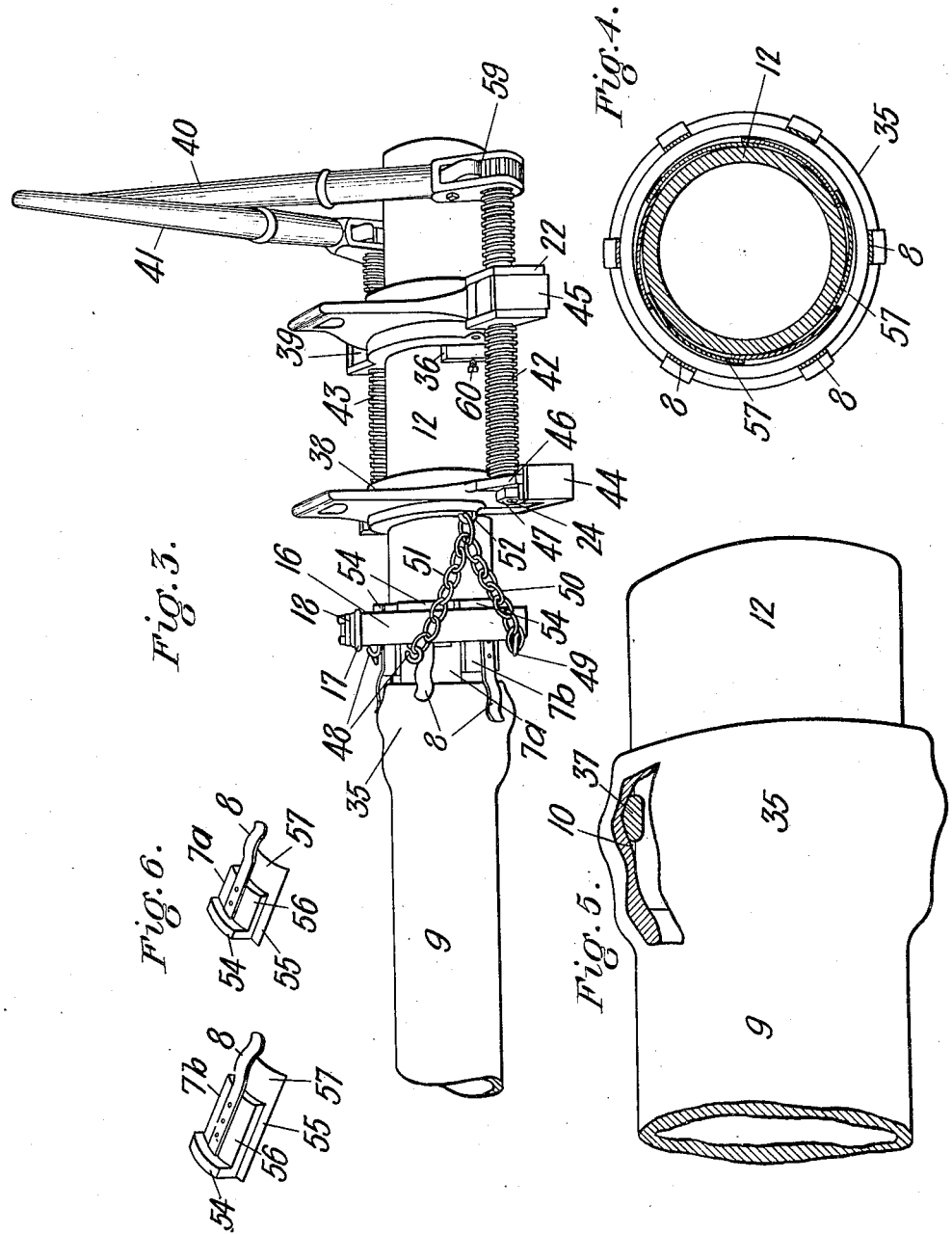

UNITED STATES PATENT OFFICE.

DANIEL M. KENYON, OF BRADFORD, PENNSYLVANIA, ASSIGNOR OF ONE-HALF TO JAMES B. ETHERINGTON, OF BRADFORD, PENNSYLVANIA.

APPARATUS FOR COUPLING PIPES.

No. 889,315.  Specification of Letters Patent.  Patented June 2, 1908.

Application filed May 31, 1907. Serial No. 376,642.

*To all whom it may concern:*

Be it known that I, DANIEL M. KENYON, a citizen of the United States, residing at Bradford, in the county of McKean and State of Pennsylvania, have invented new and useful Improvements in Apparatus for Coupling Pipe, of which the following is a specification.

My invention relates to apparatus for coupling pipe, and the object of my invention is to provide an effective means of uniting two sections of pipe to make their tubular portions continuous.

My invention consists in constructing a mechanical device designed to accomplish the assembling of pipe by inserting one section or member within the packing ring and enlarged portion of another member or coupling.

My invention further consists in the various details of construction and improvements hereinafter specifically described and claimed.

Reference is hereby made to the accompanying drawing in which similar numerals of designation refer to similar parts throughout the several views.

Figure 1 is a perspective view of my assembling apparatus showing the position of the yokes, inserting implements, traversing nuts, and double screws before the pipes are put together. Fig. 2 is a view in perspective of my assembling apparatus showing its position upon the sections of pipe after the same have been put together. Fig. 3 is a view in perspective of that portion of my apparatus which is used for removing the inserting slips after the pipes have been assembled. Fig. 4 is a cross section on line 4—4 of Fig. 2 looking in the direction of the arrows. Fig. 5 is a view partly in section and partly in elevation, showing the packing or gasket in its recess after one section of pipe has been inserted within the other. Fig. 6 shows perspective views of the long and short inserting slips respectively. Fig. 7 is an end elevation of the removal collar. Fig. 8 is a side elevation of the double screw. Fig. 9 is a side elevation of the single screw. Fig. 10 is a view in elevation of the yoke shown in Fig. 1. Fig. 11 is an end elevation of a modification of said yoke.

Referring to the drawing, 9 is a tubular pipe section having in one end thereof an enlargement or head 35 (see Fig. 5), containing a recess 10 adapted to receive and retain an annular ring of compressible packing 37, and to allow the introduction of the plain end of the pipe section 12 through the use of my improved apparatus hereinafter described.

7ª and 7ᵇ are inserting strips or implements each of which is preferably formed with a blade 57 designed to be introduced into the interior of the enlargement 35, and to press outwardly on the packing 37.

56 is an enlargement of the implement which forms am abutment and prevents the slip from further entering the pipe.

8 is a finger designed to engage with the exterior of the head 35 and to hold the slip in position.

54 is a boss or flange which serves the purpose of providing a means by which the strip may be withdrawn after the two pipes have been assembled.

13 and 14 are two oppositely arranged yokes having on each side thereof nut sockets 19 and 20 adapted to receive and retain traversing nuts 21 and 23.

27 and 28 are lugs containing the holes 29 and 30 for the purpose of conveniently handling the yokes and for bracing the same, but are not essential to my invention and may be dispensed with.

25 is a double screw, the opposite ends of which engage with the traversing nuts 21 and 23. I have shown only two of these screws, but while I have found that these accomplish the objects of my invention satisfactorily, I by no means desire to limit myself to the use of such number, but may employ a larger number of screws should occasion and circumstance require. The ends 31, 32 of the screws are squared so as to permit the ready attachment of the jacks 33 and 34, each of which carries the ratchet and pawl 58.

36 are wedges which are introduced in the openings 61 between the inner surface of the yokes and the outer surface of the pipes. 60 are screws adapted to increase the effectiveness of said wedges in the manner well known to the art.

Referring to Fig. 3, 39 is a yoke which is used for removing the inserting strips 7ª and 7ᵇ, and which is similar to the yokes shown in Figs. 1 and 2, and is wedged against longitudinal movement in the same manner. 38 is a yoke moving freely upon the pipe and carries in each of its sockets 44 a swivel plate 46 in which is secured by a nut or rivet 47 the screw stem 24 on the screw 42. 45 are nut sockets containing nuts 22 similar to those before described. 52 are two hooks preferably integral with the yoke 38 and adapted to receive one of the middle links of the chain 50, 51, which is secured at its opposite extremities to staples or hooks 48 and 49 on the removal collar. The removal collar is made in two parts 15 and 16 as shown in Fig. 7, and is pivoted at 64; their upper extremities are secured together by means of the metal loop 17, which is pivotally mounted on part 15 and which engages with the metal tongue 18, and thus locks the collar. The said collar is of such diameter that it can readily surround the said implements 7$^a$ and 7$^b$ and at the same time engage with the flanges 54. 40 and 41 are jacks similar to 33 and 34 and each carry the rachet and pawl 59.

In Fig. 11 I have shown a modification of the yoke shown in Figs. 1, 2, 3 and 10. It is made in two parts which are secured together by means of the lock joint 62 and pin 63. At the sides thereof are nut sockets 19 similar to those before described.

The mode of operation of my apparatus is as follows:—I first insert the implements 7$^a$ and 7$^b$ so that the edges 55 thereof shall overlap the adjacent edges of the implements in the manner shown in Fig. 4. I next place the yokes 13 and 14 upon the pipe and wedge the same securely against longitudinal movement. The traversing nuts 21 and 23 are turned to the extremities of the screw 25 and are installed in the boxes or sockets 19 and 20. The jacks 33 and 34 are then placed upon the square ends 31 and 32, and are worked back and forth simultaneously until the pipe 12 is gradually drawn within the slips 7$^a$ and 7$^b$, the packing 37 is compressed into the space between the pipes, and the two members duly installed. To remove the inserting implements I employ the device shown in Fig. 3. I first remove the yokes 13 and 14 together with their screws, nuts, jacks, etc.; and upon the pipe 12 in a suitable position I place the yoke 39. On another portion of the pipe a little nearer to the strips I place the freely moving yoke 38, and over the inserting strips I lock the two parts of the collar 15 and 16. Then by working the single screws 42 and 43 by means of the jacks 40 and 41, I gradually draw the inserting strips out of the joint. In some instances I prefer to employ the improved yoke shown in Fig. 11. The construction of the lock joint 62 enables it to be readily installed while in the ditch, and the pin 63 securely fastens the two portions of the same together. Upon driving the wedges into the openings 61 and adjusting the other parts of the apparatus, the yoke is ready for use. Where the packing ring is normally thicker than the space which it is to occupy when the pipes are assembled, great force is necessary to compress the ring so as to enable one pipe to be inserted within the other and afterwards to remove the inserting implements. In such cases my apparatus will be found of special utility, as the amount of power employed is very great, and if necessary can be increased by using more screws or having them of finer thread. Thus I am enabled to apply great force with the expenditure of but little effort, a factor which is of considerable practical value where the pipes are put together in ditches or in other places difficult of access.

Being simple in construction and composed of a number of removable parts my apparatus can be readily broken down or put together simply by disposing of the wedges and by lifting the traversing nuts out of their sockets, or dropping them in, so that with a number of workmen the several parts are easily transported and installed when they are working on a line. My invention may also be utilized for pulling the two portions of a pipe line together, where for any reason a section has been forced out of its joint, as, for instance, on side hills or elsewhere where the sections are likely to sag and pull apart.

While I prefer to use a double screw as shown in Figs. 1 and 2, I by no means desire to limit myself to the use of this particular form of screw. For the sake of economy, the apparatus shown in Fig. 3 may be employed for assembling the pipe as well as removing the inserting implements. When used for the former purpose, the chain 50, 51 is disconnected and yokes 38 and 39 are placed in the same relative positions occupied by yokes 13 and 14 in Fig. 1, and wedged in the same manner. By turning the screw in the opposite direction to that above described for removing the implements, the pipe sections will be drawn together.

What I claim and desire to secure by Letters Patent is:—

1. In an apparatus for coupling two sections of pipe the heads thereof containing rings of compressible packing, yokes adapted to be secured to each of said sections, combined with means for compressing said packing, and means for drawing said yokes towards each other and introducing the plain end of one of the sections within the packing ring in the head of the other while said packing is being compressed.

2. In an apparatus for coupling two sections of pipe the heads thereof containing rings of compressible packing, a yoke adapted to be secured to one section, a second yoke adapted to be secured to the other section, screws engaging with each of said yokes, combined with means for compressing said packing, and means for turning said screws and drawing the plain end of one of said sections within the packing ring in the head of the other while said packing is being compressed.

3. In an apparatus for coupling two sections of pipe, the heads thereof containing annular rings of compressible packing, yokes adapted to be secured to each of the two sections, inserting slips constructed to cover the interior surface of said packing, combined with means for drawing said yokes toward each other and inserting the plain end of one of the sections within the said slips in the head of the other.

4. In an apparatus for coupling two sections of pipe, yokes oppositely arranged and adapted to be secured to each of said sections, screw threaded openings in said yokes extending parallel to the axis of the pipe, double screws engaging with said openings, combined with means for simultaneously turning said screws and drawing said sections together.

5. In an apparatus for coupling two sections of pipe, yokes oppositely arranged and adapted to be secured to each of said sections, screw threaded openings in said yokes extending parallel to the axis of the pipe, double screws engaging with said openings, combined with means for simultaneously turning said screws and evenly drawing said sections together.

6. In an apparatus for coupling pipe, a yoke adapted to be secured to one section of pipe, a yoke adapted to be secured to the other section of pipe, traversing nuts affixed to said yokes, double screws adapted to turn within said nuts, combined with means for simultaneously turning said screws and evenly drawing said sections together.

7. In an apparatus for coupling pipe, yokes adapted to be secured by wedges to each of two sections of pipe, traversing nuts affixed to said yokes, double screws adapted to turn within said nuts, combined with means for simultaneously turning said screws and evenly drawing said sections together.

8. In an apparatus for inserting one section of pipe within another section larger in diameter inserting implements, a yoke adapted to be secured to the smaller pipe, a second yoke adapted to slide freely on said pipe, a collar connected with said second yoke and adapted to engage with the upturned ends of the inserting implements after the said sections have been assembled, combined with means for drawing said collar and second yoke toward the stationary yoke.

9. In an apparatus for inserting one section of pipe within a section larger in diameter inserting implements, a yoke adapted to be secured to the smaller pipe and carrying traversing nuts, a second yoke adapted to slide freely on said pipe and carrying swivel plates, a collar connected with said second yoke and adapted to engage with the upturned ends of the inserting implements after the said sections have been assembled, screws turning within said nuts and engaging said swivel plates, combined with means for turning said screws for the purpose of withdrawing said inserting implements.

10. In an apparatus for coupling pipe, a cylindrical yoke composed of two semi-circular members having their upper extremities pivoted together and their lower extremities arranged to interlock with each other, said yoke being provided with sockets for the reception of traversing nuts.

11. In an apparatus for coupling pipe, a removable collar made in two pieces hinged together, the free ends being locked by a metal loop pivotally fastened to one end and engaging with the projection upon the other end, and chains fastened to said collar for the purpose of moving the same longitudinally upon the pipe.

In testimony whereof I have hereunto set my hand in presence of two subscribing witnesses, this 20th day of May 1907.

DANIEL M. KENYON.

Witnesses:
   D. H. JACK,
   WILLIAM C. PURPLE.